(12) United States Patent
Whitaker et al.

(10) Patent No.: US 9,044,895 B2
(45) Date of Patent: Jun. 2, 2015

(54) PRE-APPLIED PROTECTIVE JACKETING TO GROOVED INSULATION

(76) Inventors: Thomas Whitaker, Grand Junction, CO (US); Kevin J. MacKinnon, Mendham, NJ (US)

( * ) Notice: Subject to any disclaimer, the term of this patent is extended or adjusted under 35 U.S.C. 154(b) by 0 days.

(21) Appl. No.: 13/408,493

(22) Filed: Feb. 29, 2012

(65) Prior Publication Data

US 2012/0160401 A1     Jun. 28, 2012

Related U.S. Application Data

(62) Division of application No. 12/259,002, filed on Oct. 27, 2008, now Pat. No. 8,142,879.

(60) Provisional application No. 60/989,376, filed on Nov. 20, 2007.

(51) Int. Cl.
*B29C 53/00* (2006.01)
*B29C 65/00* (2006.01)
(Continued)

(52) U.S. Cl.
CPC ......... *B29C 53/063* (2013.01); *Y10T 156/1036* (2015.01); *Y10T 428/2457* (2015.01); *Y10T 428/24496* (2015.01);
(Continued)

(58) Field of Classification Search
CPC ........ B29C 53/00; B29C 53/02; B29C 53/04; B29C 53/36; B29C 65/00; B29C 65/48; B29C 65/4725; B29C 65/52; B32B 3/00; B32B 3/04; B32B 3/10; B32B 3/14; B32B 3/18; B32B 7/00; B32B 7/04; B32B 7/06; B32B 7/12; B32B 9/00; B32B 9/005; B32B 9/042; B32B 17/062; B32B 15/046; B32B 13/045

USPC ................ 156/217, 196; 228/144; 428/36.91, 428/41.8, 42.2, 167, 172; 52/723.1, 736.3, 52/737.4, 738.1; 138/118.1, 128, 137, 138/140, 151, 156, 172
See application file for complete search history.

(56) References Cited

U.S. PATENT DOCUMENTS

| | | | |
|---|---|---|---|
| 3,117,902 A | | 1/1964 | Holzhelmer |
| 4,243,453 A | * | 1/1981 | McClintock .................. 156/152 |

(Continued)

FOREIGN PATENT DOCUMENTS

| | | |
|---|---|---|
| CA | 2035602 | 1/2001 |
| CA | 2018543 | 12/2001 |
| JP | 2001-208289 | 8/2001 |

*Primary Examiner* — Richard Crispino
*Assistant Examiner* — Matthew Hoover
(74) *Attorney, Agent, or Firm* — Robert D. Touslee

(57) ABSTRACT

A V-grooved composite insulation is provided with an adhesive coating and a protective jacketing material bonded to the adhesive. The protective jacketing material extends beyond the perimeter of the grooved insulation board and comprises at least one intact release layer at a location in which the protective jacketing is clear of contact with the bottom surface of the insulation member and a pressure sensitive adhesive between the portion of the protective jacketing material and the at least one release layer. The method also comprises preshaping the grooved insulation board around a pipe by bending the grooved insulation board, removing the release layer of the protective jacketing material, thereby exposing the pressure sensitive adhesive and securing the pressure sensitive adhesive to the protective jacketing to thereby surround the pipe in a vapor free manner. Grooved insulation boards with protective jacketing so constructed are also provided.

7 Claims, 4 Drawing Sheets

(51) Int. Cl.
*B21D 39/00* (2006.01)
*B23K 31/02* (2006.01)
*B29D 22/00* (2006.01)
*B29D 23/00* (2006.01)
*B32B 1/08* (2006.01)
*F16L 11/04* (2006.01)
*B32B 9/00* (2006.01)
*B32B 33/00* (2006.01)
*B32B 3/28* (2006.01)
*B32B 3/30* (2006.01)
*B32B 3/00* (2006.01)
*F16L 11/00* (2006.01)
*F16L 9/14* (2006.01)
*F16L 9/00* (2006.01)
*B29C 53/06* (2006.01)
*B32B 3/10* (2006.01)
*B32B 7/12* (2006.01)
*F16L 59/02* (2006.01)

(52) U.S. Cl.
CPC .......... *Y10T 428/24612* (2015.01); *B32B 3/10* (2013.01); *B32B 7/12* (2013.01); *F16L 59/022* (2013.01); *F16L 59/023* (2013.01)

(56) References Cited

U.S. PATENT DOCUMENTS

| | | | |
|---|---|---|---|
| 4,794,027 A | 12/1988 | Hering | |
| 4,838,968 A * | 6/1989 | Nelson | 156/64 |
| 4,954,202 A | 9/1990 | Price et al. | |
| 5,310,594 A * | 5/1994 | Holland et al. | 428/167 |
| 5,626,982 A | 5/1997 | Kawai et al. | |
| 5,725,723 A * | 3/1998 | Cusick et al. | 156/502 |
| 5,783,274 A * | 7/1998 | Knittel et al. | 428/36.9 |
| 5,824,382 A | 10/1998 | Ruby | |
| 6,986,367 B2 | 1/2006 | Toas et al. | |
| 2006/0231193 A1* | 10/2006 | Bright | 156/217 |
| 2008/0206543 A1* | 8/2008 | Whitaker et al. | 428/304.4 |

* cited by examiner

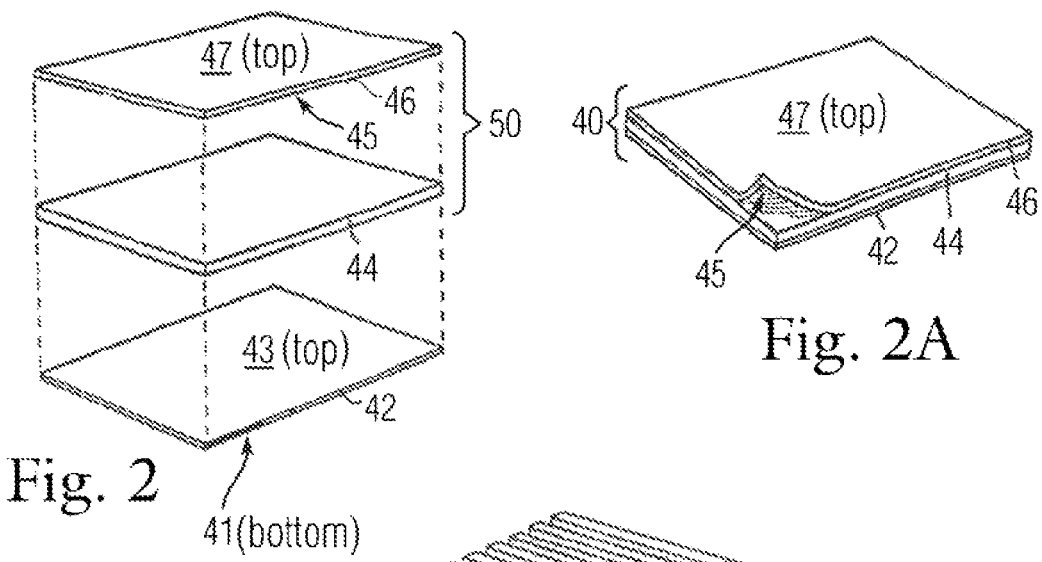
Fig. 2A
Fig. 2
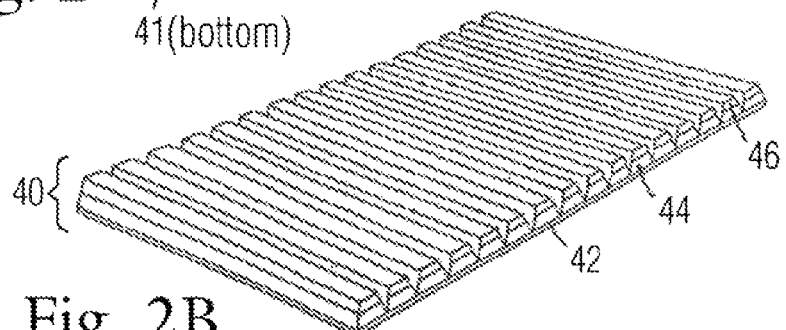
Fig. 2B
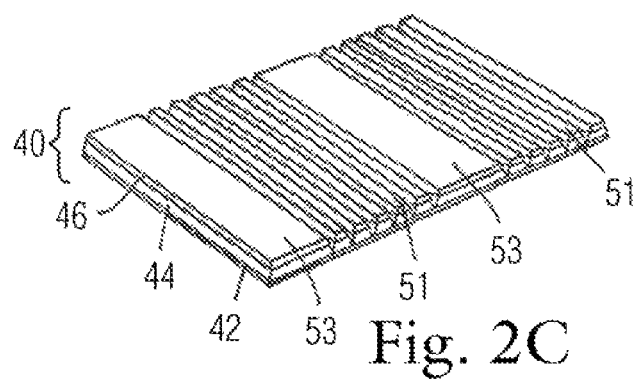
Fig. 2C
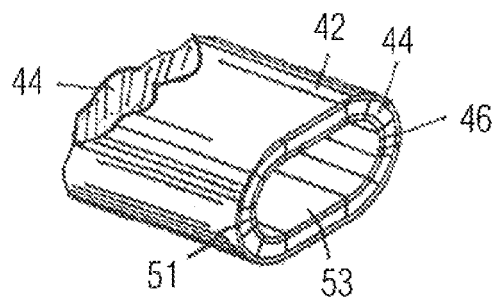
Fig. 3

PRE-APPLIED PROTECTIVE JACKETING TO GROOVED INSULATION

CROSS-REFERENCE TO RELATED APPLICATION

This application is a divisional of U.S. patent application Ser. No. 12/259,002, filed Oct. 27, 2008, which claims priority to U.S. Provisional Patent Application Ser. No. 60/989,376, which was filed on Nov. 20, 2007, each of which are incorporated herein by reference in their entirety.

FIELD OF THE INVENTION

The present invention relates to improvements in jacketed pipe and equipment insulation useful for securement of the insulation to the pipe or equipment, and resistance to abuse from outside elements and forces, including weather, as well as resistance to any corrosion of materials disposed under the insulation.

BACKGROUND OF THE INVENTION

U.S. Pat. Nos. 4,838,968 and 4,954,202 disclose a method and apparatus for making V-grooved insulation from rigid material. As disclosed therein, a rigid, or semi-rigid board, such as mineral wool, is carried by a conveyor through a series of steps wherein a backing material is applied to one surface of the board and the opposite surface of the board has a series of V-grooves defined in the board and extending up to but not severing the backing layer. The disclosed apparatus and process permits the manufacture of V-groove insulation wherein the spacing of the V-grooves can be varied and controlled based on the particular application. An advantage results because the so-modified insulation boards can be made to confirm to a curved surface.

It would be desirable to provide V-grooved insulation amenable for bonding or adhering a protective jacketing, as well as to provide pre-attached protective jacketing to a V-grooved insulation member (thereby forming a V-grooved composite structure), which in combination, can provide improved protective jacketing properties, as compared to the current state of the art. In addition, decreased costs and installation times result from a V-grooved composite structure as only one installation step is necessary. Known grooved insulation members lack protective jacketings and thus have to be fit with the jackets in the field. Furthermore, known grooved insulation members are not manufactured so as to securely bond with protective jacketings.

Typically, protective jacketings are not adhered to industrial insulation, the two are simply fastened or banded together. This is because most industrial insulation is friable, dusty, brittle and fibrous in nature. These characteristics do not allow for direct bonding of the insulation to a protective jacketing. Therefore, the installation process is inherently slow, as the protective jacketing cannot be installed without first installing an insulation around a pipe or piece of equipment. In addition, when the insulation and protective jacketing are fastened together, gaps, however miniscule, remain between the insulation and protective jacketing. The movement of the jacketing prevents an air tight seal and therefore opens the possibility for water or water vapor, or other electrolytes, to be absorbed or condensed onto the insulation, leading to corrosion under insulation (CUI). It would be desirable to provide insulation amenable for bonding or adhering uniformly to a protective jacketing. This would allow application of a protective jacketing in a factory setting, which would dramatically decrease installation time (and cost) in the field (e.g., by reducing tools, labor and materials).

The present invention addresses this and other needs in the art.

SUMMARY OF THE INVENTION

In one aspect of the invention, a coated insulation with a plurality of V-grooves includes a flexible protective jacketing to define a flat shape-formable composite insulation.

In a further aspect of the invention, the composite insulation comprises an insulation member having a top surface and a bottom surface, and pores in at least the bottom surface. An adhesive coating is disposed on the bottom surface and within the pores of the insulation member. A protective jacketing having an inner surface is in contact with the coated bottom surface of the insulation member (having a plurality of V-grooves). The V-grooves are defined at spaced intervals in the top surface of the insulation member and extend through the insulation member to a point proximal to the protective jacketing. Each of the plurality of V-grooves can include a pair of opposed faces that meet at an apex, with pairs of opposed faces being selectively urgeable to an abutting relationship with one another to define at least one substantially curved portion along the outer surface of the protective jacketing material.

In another aspect of the invention, a composite insulation as described above can have a flexible backing layer disposed between the protective jacketing and the coated insulation board.

In another aspect of the invention, the insulation member can comprise two dissimilar insulating materials. The insulating materials can be adjacent to one another.

In yet another aspect of the invention, one face of at least some of the V-grooves of the composite insulation is coated with an adhesive material, preferably automatically after the V-grooves are cut into the insulation on the V-grooving apparatus. When the V-groove insulation is shaped, the adhesive on the one face of the V-groove can adhere to the opposite face of the V-groove to retain a given shape. In a further aspect, all of the V-grooves can have one face coated with the adhesive except for the center V-groove of the composite insulation. In this aspect, the protective jacketing layer of the composite insulation section where the V-groove is not coated serves as a hinge. The insulation can, therefore, be shipped from the place of manufacture to the place of use as a flat board. At the place of use, the sections can be shaped by joining the V-groove walls together. The V-groove walls adhere to each other around the pipe as two half circles. This feature is advantageous economically due to the savings in shipping costs and also ease of application to a pipe or equipment surface.

In yet another aspect of the invention, a method for installing a V-grooved composite insulation is provided. The method entails providing a grooved insulation board coated with an adhesive, the insulation board having a protective jacketing material bonded to said adhesive. The protective jacketing material extends beyond the perimeter of the grooved insulation board and comprises at least one intact release layer at a location in which the protective jacketing is clear of contact with the bottom surface of the insulation member and a pressure sensitive adhesive between the portion of the protective jacketing material and the at least one release layer. The method also comprises preshaping the grooved insulation board around a pipe or piece of equipment by bending the grooved insulation board, removing the release layer of the protective jacketing material, thereby exposing the pressure sensitive adhesive and securing the pressure sensitive adhesive to the protective jacketing to thereby surround the pipe or piece of equipment, protecting the work piece from structural or weather damage.

Embodiments of the invention are described in detail in reference to the drawings and the detailed description below, from which additional advantages and features of the invention will be apparent.

BRIEF DESCRIPTION OF THE DRAWINGS

FIG. 2 is an expanded view of a composite insulation of three layers comprising a protective jacketing layer, an adhesive layer; and an insulating member (or layer);

FIG. 2A is an assembled view of the composite insulation of FIG. 2.

FIG. 2B is a perspective view of the insulation structure of FIG. 2 V-grooved uniformly across the length so as to provide a "circular" configuration when closed or wrapped;

FIG. 2C illustrates details of the insulation structure of FIG. 2 having V-grooves contained therein which are spaced so as to provide an "oblong" structure when wrapped;

FIG. 3 illustrates the structure of FIG. 2C, partly in section, in the closed or wrapped "oblong" configuration;

DETAILED DESCRIPTION OF CERTAIN EMBODIMENTS OF THE INVENTION

Definitions

"Insulating materials" as used herein means a material having low heat conductivity and an ability to withstand high temperatures without degradation or destruction.

"Rigid," as used herein, defines a structure which will not, without modification (e.g., an initial application of force), adapt to a shaped surface.

"Adhesive Layer," or "adhesive coating," as used herein, refers to any adhesive once disposed on the insulation substrate and in this regard have the same meaning. The protective jacketing described herein is associated with an adhesive which is separate from the adhesive on the insulation substrate.

"Multiform insulation," as used herein, refers to two dissimilar insulating materials which can make up an insulation member.

"Composite insulation," refers to one or more insulation members including an adhesive layer joined to a protective jacketing, and optionally an additional backing member.

"Protective jacketing material," "Protective jacketing layer," "protective jacketing," or "protective jacket," as used herein, refers to a cladding material which restricts the penetration of water through it. The protective jacketing includes an acrylic adhesive on one side of the jacketing prior to attachment to adhesive associated with an insulation substrate, and is used to secure the jacketing to the V-grooved, coated substrate. The protective jacketing adhesive can be comprised of the same or different adhesive used in the "adhesive layer," described supra.

"Coated insulation" refers to an insulation member with at least one of its surfaces having an adhesive coating disposed on it, that absorbs, at least partially, into the pores of the insulation member's surface for a good bond therebetween. The coat is disposed on at least the surface which is joined to another layer of the composite insulation, for example, the surface that receives the protective jacketing layer.

Figure 1:
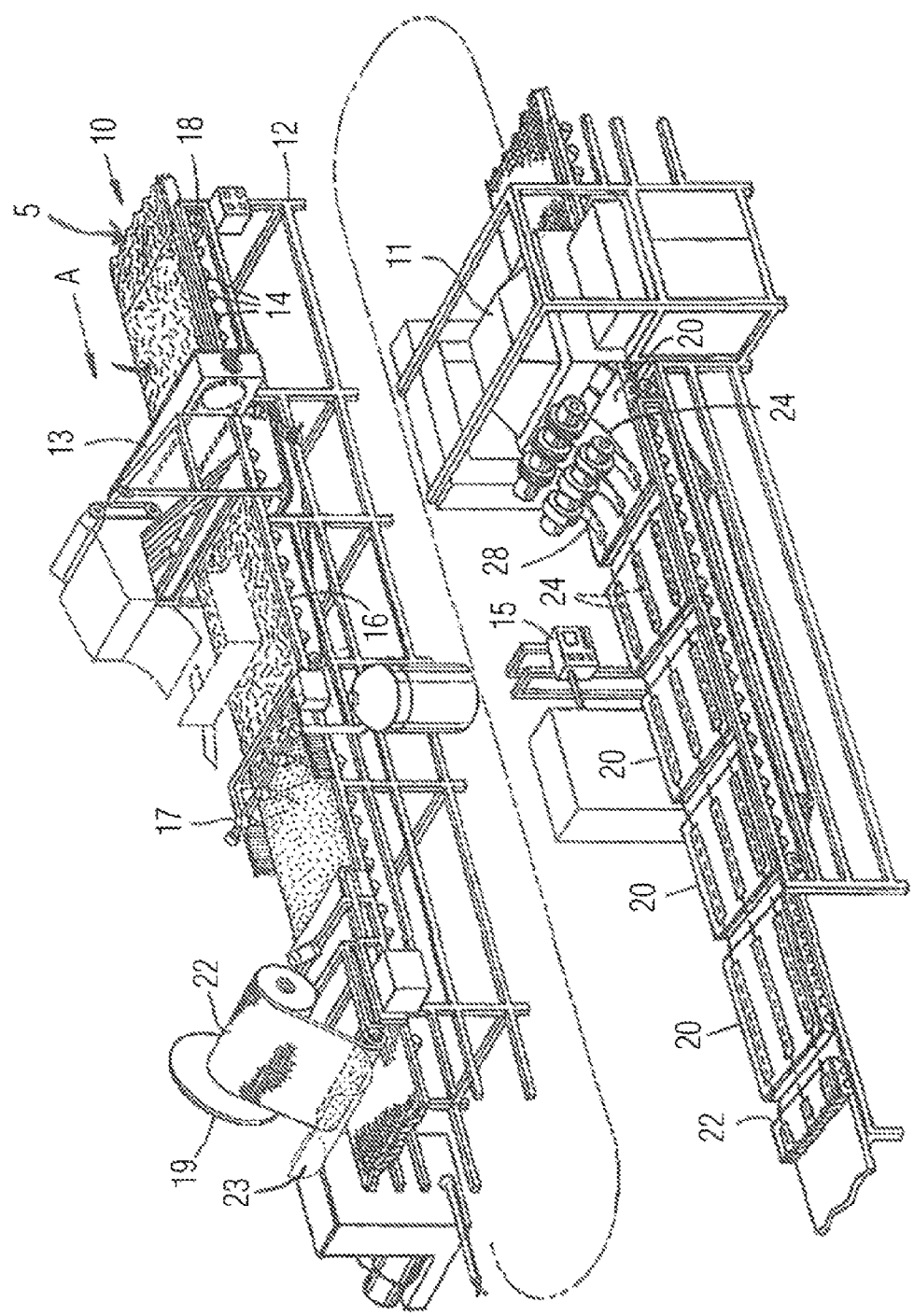
FIG. 1 is a perspective view of a V-groove machine adapted in accordance with certain aspects of the present invention from that known from U.S. Pat. No. 5,310,594.

As illustrated in FIG. 1, the V-grooving apparatus 10 is comprised of a combination of stations each disposed along, above, or proximate to an endless track conveyor system. The conveyor system as defined in U.S. Pat. No. 4,954,202 is hereby incorporated by reference and comprises an upright tubular frame 12 along the top of which are secured a plurality of rollers 14, or the like, to form a bed 16. Flexibly disposed over these rollers 14 is a conventional looped belt arrangement, not shown, driven by a motor through guide rollers 18 such that an insulation member, e.g., a section of mineral wool insulation or multiform insulation, placed atop the system will be moved longitudinally down the frame 12 for processing as shown by direction arrow A. The travel rate of the conveyor system and the different functions are controlled by a microprocessor 15 which also governs the placement and frequency with which the V-grooves are cut in a given coated insulation section, at which severance of the insulation section occurs.

More specifically, insulation members are positioned on the conveyor in layers or in longitudinal sections, depending upon the ultimate insulation configurations desired.

Protection from weather and physical or structural abuse are enhanced by the addition of the protective jacketing to an insulating board. Insulating material with preapplied jacketings are desirable because they decrease installation time of insulation systems, increase the ease of installation and decrease cost of labor and materials. For instance, adding a protective jacketing to installed insulation materials requires the manual wrapping of the insulation material with the jacketing and then the use of ties that compress and hold the jacketing to the insulation, and the quality of the weather and physical protection supplied by the jacketing is a function of the skill of the workers performing that installation. Preassembled jacket-insulation systems can also lead to reusability of the insulation after maintenance.

It is desirable to adhere the layers or sections together by applying an adhesive to the insulation member, followed by bonding of the insulation member to an adhesive backed protective jacketing while the adhesive on the insulation member is still tacky. The protective jacketing is backed with an acrylic adhesive which bonds to the adhesive layer, disposed on the insulation. After proper shaping in shaper 13, the insulation member is sprayed with an adhesive at station 17, with a protective jacketing 22 being applied at station 19 to the coated insulation. The protective jacketing can be applied by peeling off a protective release layer 23, as shown, thereby exposing the adhesive on the back of the protective jacketing 22. The adhesive coating sprayed on the insulation establishes an interface between the insulation and the protective jacketing without a gap that allows the jacketing to remain in place, once installed. The protective jacketing can be applied directly to the adhesively coated insulation member or can be affixed to a flexible backing layer, such as they type described in U.S. Pat. No. 5,310,594, which in turn contacts the coated insulation member. Typically, the protective jacketing is bonded to the coated insulation by harnessing both the adhesive sprayed on the insulation and the adhesive on the back of the protective jacketing.

As a departure from the approach taught in U.S. Pat. No. 5,310,594, instead of providing a backing layer that serves as a structural support for the insulation member, a protective jacketing layer can be provided instead, which has multiple functionality in that it protects the insulation and work piece (e.g., pipe or piece of equipment) from weather and physical damage, as well as simultaneously providing the insulation member with a structural support. The enhanced functionality of the protective jacketing layer eliminates the need for an additional backing layer in the composite insulation, although another arrangement within the scope of the invention is to provide both a backing layer and a protective jacketing layer for use in a composite V-grooved insulation. A backing layer that merely provides support is typically comprised of a glass matt fabric. The glass matt is porous in nature, and consequently, cannot be used as a protective jacketing.

The composite insulation 20 is passed through a saw station 11, at which point V-grooves are positioned in the uncoated surface of the composite insulation 20, into and through the uncoated portion of the coated insulation member 50, but not deep enough to penetrate the protective jacketing layer 22 (or backing layer, if both a backing layer and protective jacketing layer are provided). Optionally, thereafter, attaching bands 24 are applied to the composite insulation 20.

In the present invention, an adhesive is disposed on one surface of the insulating material 5 at station 17, and in this form, the coated insulation 50 is introduced to the V-grooving station 11. A protective jacketing 22 can be applied to the adhesive layer at station 19, and optionally a flexible backing layer is applied serially, at another station like station 19 (not shown), preferably upstream of the V-grooving operation at the insulation at station 11.

Referring briefly to FIGS. 2 and 2A, the composite insulation 20 of FIG. 1 is shown as layered structure 40, with like elements being accorded similar reference numerals. The adhesive layer 44 is disposed on at least the bottom surface 45 of the insulation member 46 to create the coated insulation 50. For purposes of illustration, the adhesive layer is shown in the exploded view as a geometrically stable layer, but it is actually a solution applied to the insulation member 46. The coating provides a uniform interface between the insulation 46 and protective jacketing 42.

The adhesive layer, once disposed upon the insulation, does not change the insulating properties of the thermal insulation due to minimal absorption into the insulation layer.

In one insulation preparation method, the adhesive coating can be applied to an exterior surface of the thermal insulation by brush to form a coated insulation. Alternatively, the adhesive coating can be applied to the exterior surface of the insulation by low pressure spray (as shown in FIG. 1).

Preferably, the protective jacketing 42 is chosen from the VENTURECLAD™ 1577 (five-ply) or 1579 (thirteen-ply) series of laminated aluminum foil/polyester film jacketings, available from Venture Tape Corp. of Rockland, Mass. However, any protective jacketing can be used with the present invention. Each VENTURECLAD™ protective jacketing includes a pressure sensitive adhesive layer and can be applied directly to the coated insulation member without any intervening layer. If necessary, a roller, such as a paint roller, can be used to flatten the applied jacketing. Preferably, the protective jacketing is applied momentarily after the insulation is coated with an adhesive, while the adhesive is still tacky. The protective jacketing also includes a release layer 23 which is removed at station 22, prior to application of the protective jacketing to the coated insulation. The removal of the release layer exposes the protective jacketing's pressure sensitive adhesive. Once the release layer is removed, the protective jacketing is amenable for adhering and bonding to the coated insulation.

Depending on the desired thickness of the adhesive coating layer, the shape of the insulation, and uniformity requirements for the adhesive layer, one of the coating methods described above, or a combination of the methods, may be preferred over the others. For example, edges of the insulation may be unable to be coated by spraying the composition and a brush step can be employed to contact areas of the exterior insulation surface the spray is not able to reach. Once the adhesive layer is applied, the coated insulation (with backing/protective jacketing affixed) can be moved along the apparatus 10 towards the saw 11 (see FIG. 1) to define the V-groove. The V-grooves are positioned in the uncoated surface of the composite insulation (at defined intervals supplied by the user).

Optionally, a plurality of bands 24 can be uniformly spaced on the outer surface of the protective jacketing layer, e.g., uniformly, with the timing being controlled so that there is a length, approximately an inch and one-half (1.5"), of band extending beyond the leading edge of the composite insulation 20. The band can be cut after the trailing edge of the section is sensed and an additional length of approximately an inch and one-half (1.5") extends beyond the section. Simultaneously, a tape 28 is applied over the band in order to firmly affix the band to the composite insulation.

In various embodiments, bands are not applied to the outer surface of the backing or protective jacketing. In these embodiments, the protective jacketing is installed onto the insulation with an adhesive overhang having a release layer which remains in place until installation of the panel, as described in U.S. co-pending Provisional App. Ser. No. 60/887,892, filed on Feb. 2, 2007, from which U.S. patent application Ser. No. 11/938,675, filed Nov. 12, 2007, Published Aug. 28, 2008 as U.S. Pub. No. US 2008-0206543 A1, claims priority, both of which are entitled "Pre-Applied Protective Jacketing Construction For Pipe And Block Insulation." The protective jacketing protected by the release layer can seal any exposed edges or seams between adjacent products or between overlapping sheets of the protective jacketing.

Referring again to FIGS. 2 and 2A, one embodiment of the invention is illustrated in which composite insulation 40 comprises a protective jacketing layer 42 with a top 43 and bottom 41 surface, an adhesive layer 44, and an insulating member 46 having a top 47 and bottom 45 surface. An optional additional backing layer (e.g., a glass matt backing layer, not shown) can be disposed between the protective jacketing layer 42 and the adhesive layer 44. The adhesive layer 44 is disposed on at least the bottom surface 45 of an insulating member 46. In addition, one or more additional insulation members 46' can be present, either stacked upon the top layer 47 of the first insulating member 46, or disposed alongside insulation member 46. In the side-by-side arrangement, at least the bottom surfaces of both insulations are coated with the adhesive coating.

Figure 4:
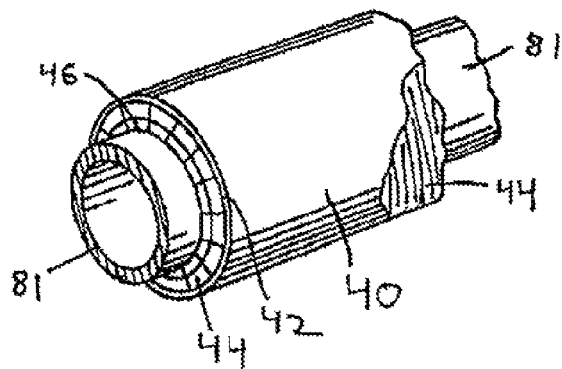
FIG. 4 is a perspective view showing the insulation structure of FIG. 2B, partly in section, wrapped around a pipe.

The composite insulation 40, after being V-grooved, can be used to wrap various shaped objects as a function of the spacing and frequency of the V-grooves for each particular shape to be wrapped. The composite insulation 40 can be V-grooved to close around a circular or oblong structure. When the insulation is uniformly grooved as shown in FIG. 2B, the composite insulation can be used to wrap a round pipe 81, as illustrated in FIG. 4.

FIG. 2C shows an embodiment in which the composite insulation is not uniformly V-grooved. The composite insulation comprises a first length of close V-grooving 51, followed by a length 53 where there are no V-grooves, followed by a length of close V-grooving 51, followed by an additional length 53 where there is no V-grooving. When the V-grooved section is wrapped or closed, the insulation will have an oblong shape as shown in FIG. 3, permitting the insulation to cover an oblong object such as a plurality of cables or cable trays, I-beams, or the like.

In some embodiments, the insulation member in the composite insulation is comprised of mineral wool or fiberglass. In other embodiments, the composite insulation can comprise adjacent insulation materials with similar or dissimilar properties, which make up the insulation member (i.e., a multiform insulation). The adjacent insulation materials can be uniform or alternatively, can vary in width. Additionally, the insulation materials can have mechanical and insulation properties that are similar or different. A composite insulation that comprises two or more adjacent insulation materials can be V-grooved either in either a horizontal or vertical direction.

Figure 5:
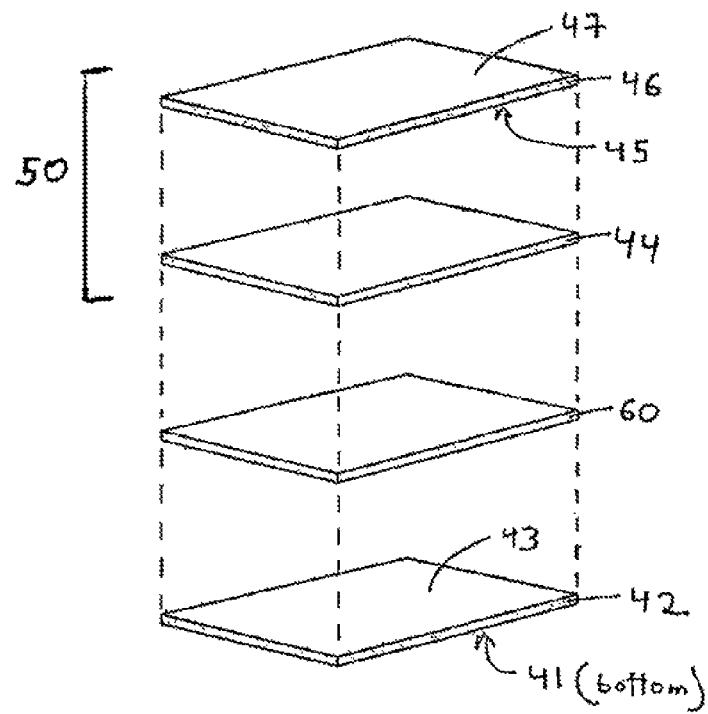
FIG. 5 is an expanded view of a composite insulation comprising a protective jacketing; a separate backing layer, an adhesive layer, and an insulating layer.
Figure 5A:
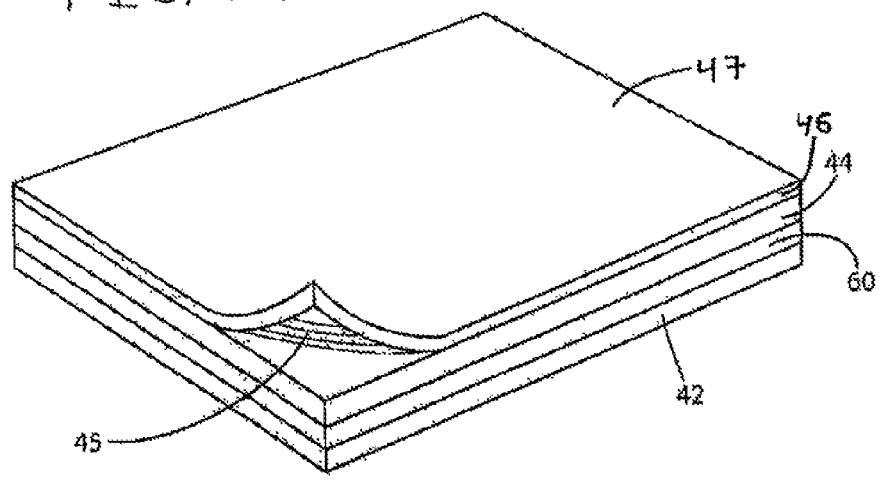
FIG. 5A is an assembled view of the composite insulation of FIG. 5.

In one embodiment, as shown in FIGS. 5 and 5A, the coated insulation materials are affixed to a flexible backing member 60 which is then affixed to a protective jacketing. In this embodiment, the composite insulation can be held in place around a structure such as a pipe with wires affixed to the back of the outer layer as generally described in U.S. Pat. No. 5,310,594, or with a pressure sensitive adhesive layer (protected by a release layer before application), as described in U.S. Provisional App. Ser. No. 60/887,892. In various embodiments, the composite insulation can be held in place around a structure such as a pipe by a combination of wires and pressure sensitive adhesive.

It is not necessary in most multiform insulations made in accordance with this invention to have the various insulations glued together. Because of the V-grooving and the positioning of the protective jacketing, the insulation materials are normally held together without adhesive. It is, of course, possible, to apply adhesive between the different insulation materials if desired. If it is desired to do so, this is done at the time the materials are positioned on the conveyor. The same adhesive applied at station 17 can be used to adhere various insulation members together.

Figure 6:
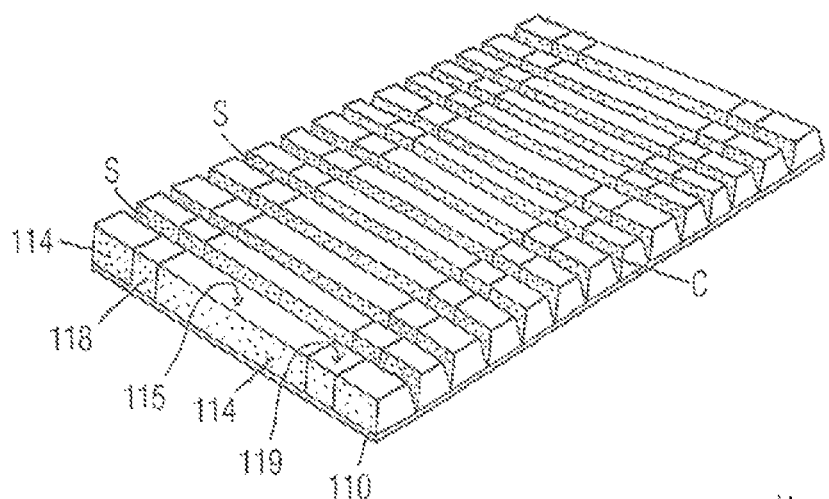
FIG. 6 is a perspective view of the composite insulation wherein the V-grooves are spaced to fit around a circular pipe and having one face of each of the grooves coated with an adhesive, but for the middle groove.
Figure 7:
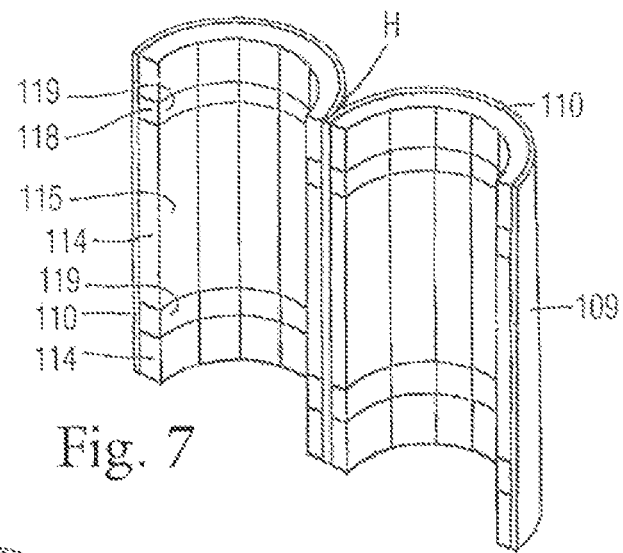
FIG. 7 is a perspective view illustrating the composite insulation of FIG. 6 with the insulation wrapped or closed so as to provide two half circles hinged through the flexible backing layer at the mid-point where the V-groove is not coated with adhesive.
Figure 8:
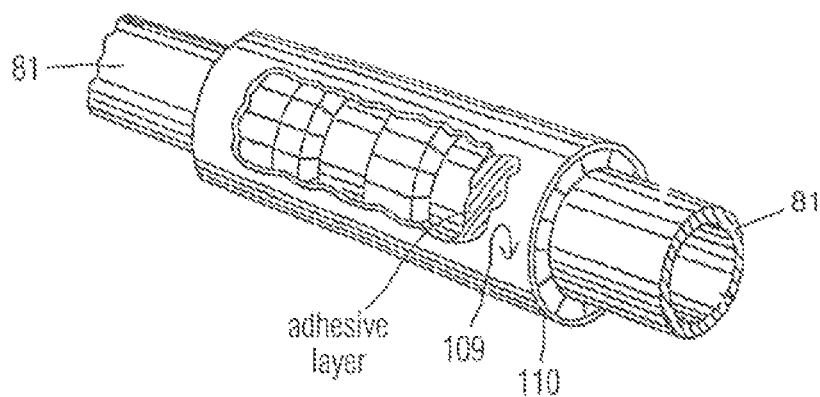
FIG. 8 illustrates the insulation structure of FIG. 7, partly in section, wrapped around a pipe.

FIG. 6 illustrates an embodiment of the invention wherein after the material is V-grooved an adhesive S, such as a pressure-sensitive adhesive (which can be similar or different than the adhesive applied at station 17 in FIG. 1), is applied to one face of the V-groove. If the adhesive is applied to one face of each of the grooves, when the material is closed at the time of installation the V-grooves will automatically adhere together in the closed configuration, providing ease of application and use of the insulation. However, if, as shown in FIG. 7, one V-groove C in the center of the section does not contain an adhesive, the protective jacketing layer at that V-groove will provide a hinge H. Thus, when the insulation section is in the closed configuration, as shown at FIG. 7, the center section will form a hinge for the two formed half-sections, permitting simplified installation on a pipe 81, or the like, as shown in FIG. 8. The use and advantages of an adhesive applied to a V-grooved material in a selective manner to provide a hinge is also described in U.S. Pat. No. 5,310,594, which is hereby incorporated by reference as set forth herein. U.S. Pat. No. 3,084,403 describes the use of a hinged structure with a normally rigid grooved material.

As is apparent, the multiform or uniform insulating materials of the present invention can be tailored through use of insulating materials having diverse properties to provide composite or uniform sections of insulation ranging in width of from about four feet down to a few inches. In various embodiments, the insulation comprises layered insulation materials, wherein "layered" means a stacking of the diverse materials one on top of the other, composed of pairs of rigid materials as follows: mineral wool-foam glass; mineral wool-polyurethane foam; mineral wool-ceramic fibers; or pairs of rigid material and flexible material as follows: mineral wool-ceramic fiber blanket; mineral wool-flexible polyurethane foam. It is also possible to use three or more insulating materials. In these embodiments the mineral wool component can vary in thickness from about one-half inch to about four inches in thickness, with the second component varying from about one-half inch to about four inches in thickness to provide a total insulation thickness of from about one inch to five inches. The combinations of materials provide a multiform insulation having the advantages of one material—such as good insulative value, while minimizing disadvantages of the material—such as the difficulty of working with a material such as foam glass due to its brittleness and its relative non-conformability to diverse shapes.

Additionally, the use of two or more insulating materials provides economy through the use of a relatively costly material such as ceramic fiber where needed and the use of a relatively inexpensive material such as mineral wool where the properties of ceramic fiber are not necessary. For example, it is recognized that the insulation material closest to a pipe being insulated is subject to the greatest heat, and as the distance away from the pipe increases the material is subject to less heat, permitting the use of a material having a lower thermal value such as mineral wool.

In still other embodiments, sections of material such as mineral wool, calcium silicate, perlite or fiberglass are separated longitudinally or in the machine-direction with strips of a diverse material such as perlite. Such composites provide the advantages of mineral wool including relative low cost, but which suffer from low structural strength, with the high structural strength provided by perlite or calcium silicate. This permits a strengthened insulative structure which resists high load bearings, including the weight of a pipe, and/or permits the structure to be stepped on particularly at diverse locations.

As is apparent, in addition to having strips of the high-density material in select locations, the insulative section can comprise one-half of one rigid material and one-half of another rigid material. Alternatively, one insulating material, such as mineral wool can be harnessed for coating and subsequent V-grooving.

The insulative section can be positioned on a pipe to have the one material such as perlite positioned at the top so that the entire structure can be stepped on without damage to the insulation. As will be apparent to one skilled in the art, various modifications or materials can be made or harnessed to utilize materials varying in cost and property characteristics.

In addition, a multiform insulation may not have to be employed, e.g., a uniform insulative material can be V-grooved. In a preferred embodiment, the insulating material is comprised of mineral wool. Proper selection of materials permits use of the insulation to cover pipes, commercial grease ducts, commercial and industrial cable trays, structural steel supports such as I-beams and the like, large chemical tanks, and virtually any structure where structural integrity is essential.

As will be apparent to one skilled in the art, various modifications can be made within the scope of the invention description. Such modifications being within the ability of one skilled in the art form a part of the present invention and are embraced by the recitations in the claims set forth below and equivalents thereof.

We claim:

1. A method for installing a V-grooved composite insulation, comprising:

providing a grooved insulation board coated with a board adhesive, wherein the adhesive is applied by spraying the board adhesive onto the grooved insulation board and brushing the sprayed grooved insulation board to ensure the entire grooved insulation board is coated with the board adhesive;

providing a protective jacketing material that has an inner surface that includes a pre-applied first pressure sensitive adhesive, wherein the first pressure sensitive adhesive is disposed in direct contact with the board adhesive that is coated on the grooved insulation board to bond the protective jacketing material to the grooved insulation board, the pre-applied first pressure sensitive adhesive being separate from the board adhesive coated on the grooved insulation board, wherein substantially the entire surface of the pre-applied first adhesive opposite of the inner surface is in direct contact with substantially the entire surface of the board adhesive opposite of the grooved insulation board, wherein a portion of said protective jacketing material extends beyond the perimeter of the grooved insulation board and includes at least one intact release layer clear of contact with a bottom surface of the grooved insulation board and a second pressure sensitive adhesive between the portion of the protective jacketing material and the at least one release layer, wherein the grooved insulation board includes a plurality of V-grooves defined at spaced intervals in a top surface of the grooved insulation board and extending through the grooved insulation board, but not deep enough to penetrate the protective jacketing the protective jacketing material, each of said plurality of V-grooves being defined by a pair of opposed faces;

positioning said grooved insulation board around a pipe by bending the grooved insulation board such that pair of the opposed faces abut one another to define at least one substantially curved portion along the outer surface of the protective jacketing material;

removing the at least one release layer thereby exposing the second pressure sensitive adhesive; and securing the second pressure sensitive adhesive to the protective jacketing material to thereby surround the pipe in a vapor free manner.

2. The method of claim 1, wherein the grooved insulation board is comprised of mineral wool.

3. The method of claim 1, wherein the grooved insulation board is comprised of two adjacent dissimilar insulating materials.

4. The method of claim 1, wherein the grooved insulation board is comprised of two or more layered, dissimilar insulating materials.

5. The method of claim 1, further including the step of applying an adhesive coating to at least some of said V-grooves on at least one face of said V-grooves.

6. The method of claim 1, further including the step of spacing across and fixedly attaching a plurality of flexible bands to an outer surface of said protective jacketing material, the bands extending beyond the perimeter of said insulation member a length sufficient to permit attachment of the band ends together.

7. The method of claim 6, further including the step of applying an adhesive coating to all of the V-grooves except a center V-groove, the adhesive coating being applied to on one face of the V-groove, thereby forming a hinge at the center V-groove.

* * * * *